US012782119B2

(12) United States Patent
Koll et al.

(10) Patent No.: US 12,782,119 B2

(45) Date of Patent: Nov. 3, 2026

(54) OFF-AXIS MOTION CHARACTERIZATION OF A LINEAR ACTUATOR

(71) Applicant: Applied Materials, Inc., Santa Clara, CA (US)

(72) Inventors: Andrew Thomas Koll, West Linn, OR (US); Ayra Mae Sears, Portland, OR (US); Jered Dean Richter, Beaverton, OR (US)

(73) Assignee: Applied Materials, Inc., Santa Clara, CA (US)

( * ) Notice: Subject to any disclaimer, the term of this patent is extended or adjusted under 35 U.S.C. 154(b) by 177 days.

(21) Appl. No.: 18/753,682

(22) Filed: Jun. 25, 2024

(65) Prior Publication Data

US 2025/0003737 A1 Jan. 2, 2025

Related U.S. Application Data

(60) Provisional application No. 63/523,878, filed on Jun. 28, 2023.

(51) Int. Cl.

*G01B 11/24* (2006.01)
*G01B 11/25* (2006.01)

(52) U.S. Cl.

CPC .......... *G01B 11/2441* (2013.01); *G01B 11/25* (2013.01)

(58) Field of Classification Search

CPC ..... G01B 11/2441; G01B 11/25; G01B 11/26; A61K 38/00; A61K 38/12; A61K 45/06; A61P 31/10; C07K 14/38; C07K 7/50; C07K 7/56; C12N 1/145; C12N 15/11; C12N 15/52; C12N 15/80; C12P 21/02; C12R 2001/66

See application file for complete search history.

(56) References Cited

U.S. PATENT DOCUMENTS 5,175,601 A * 12/1992 Fitts .................. G01B 11/2513 250/237 G
10,578,494 B1 * 3/2020 Tiemann .................. G01J 9/02
2003/0090228 A1 * 5/2003 Wilkens ............. G05B 19/4062 318/560
2024/0319082 A1 * 9/2024 Yamada .................... G01J 3/45

* cited by examiner

*Primary Examiner* — Tri T Ton

(74) *Attorney, Agent, or Firm* — Lowenstein Sandler LLP

(57) ABSTRACT

A precision motion characterization system includes an interferometer configured to emit a laser beam, a first object coupled to a non-moving portion of a linear actuator, and a second object coupled to a moving body of the linear actuator. The first object is configured to reflect a first portion of the laser beam and the second object is configured to reflect a second portion of the laser beam, and a processor is to perform operations including receiving a first image comprising a plurality of first linear interference fringes corresponding to the first portion of the laser beam, determining a first characteristic of the plurality of first linear interference fringes, receiving a second image comprising a plurality of second linear interference fringes corresponding to the second portion of the laser beam, and determining a second characteristic of the plurality of second linear interference fringes.

20 Claims, 7 Drawing Sheets

OFF-AXIS MOTION CHARACTERIZATION OF A LINEAR ACTUATOR

CROSS REFERENCE TO RELATED APPLICATIONS

This application claims priority of U.S. Provisional Patent Application No. 63/523,878 titled "Off-Axis Motion Characterization of a Linear Actuator," filed on Jun. 28, 2023, the entire contents of which is incorporated herein by reference.

TECHNICAL FIELD

Some embodiments of the present disclosure relate, in general, to methods and systems for detecting off-axis motion of linear actuators in a precision motion control system.

BACKGROUND

A constructive interference occurs when two or more waves meet, and their displacements align in such a way that they add up together. The result is a new wave with a displacement that is the sum of the individual displacements of the coinciding waves. For light waves, constructive interference can lead to brighter or more intense light at the points where the wave crests or peaks align.

Destructive interference occurs when two or more waves meet, and their displacements are opposite in direction. For example, one crest aligns with a trough of another wave. The-displacements of the waves subtract each other, leading to a new wave with a reduced displacement. For light waves, this can result in darkness or "cancellation" of light at the points where a crest of one wave aligns with a trough of another.

SUMMARY

Some embodiments of the present disclosure described herein cover a precision motion control system including an interferometer configured to emit a laser beam, a first object coupled to a non-moving portion of a linear actuator, and a second object coupled to a moving portion of the linear actuator. The first object is configured to reflect a first portion of the laser beam and the second object is configured to reflect a second portion of the laser beam, and a processor is to perform operations including receiving a first image including a plurality of first linear interference fringes corresponding to the first portion of the laser beam, determining a first characteristic of the plurality of first linear interference fringes, receiving a second image including a plurality of second linear interference fringes corresponding to the second portion of the laser beam, and determining a second characteristic of the plurality of second linear interference fringes. The processor is to further determine, based at least in part on the first characteristic and the second characteristic, an off-axis motion of the second object in at least one direction.

Some embodiments of the present disclosure described herein cover a method for detecting off-axis motion in a linear actuator. The method includes reflecting, by a first object coupled to a non-moving portion of a linear actuator, a first portion of a laser beam emitted from an interferometer. The method further includes receiving, by a processor, a first image including a plurality of first linear interference fringes corresponding to the first portion of the laser beam. The method further includes determining a first characteristic of the plurality of first linear interference fringes. The method further includes reflecting, by a second object coupled to a moving portion of the linear actuator, a second portion of the laser beam. The method further includes receiving, by the processor, a second image including a plurality of second linear interference fringes corresponding to the second portion of the laser beam and determining a second characteristic of the plurality of second linear interference fringes. The method further includes determining, based at least in part on the first characteristic and the second characteristic, an off-axis motion of the second object in at least one direction.

Some embodiments of the present disclosure described herein cover a non-transitory computer-readable medium storing instructions, which when executed by a processing device, cause the processing device to perform operations including receiving a first image including a plurality of first linear interference fringes corresponding to a first portion of a laser beam and determining a first characteristic of the plurality of first linear interference fringes. The operations further include receiving a second image including a plurality of second linear interference fringes corresponding to a second portion of the laser beam and determining a second characteristic of the plurality of second linear interference fringes. The operations further include determining, based at least in part on the first characteristic and the second characteristic, an off-axis motion of an object in at least one direction.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1A:
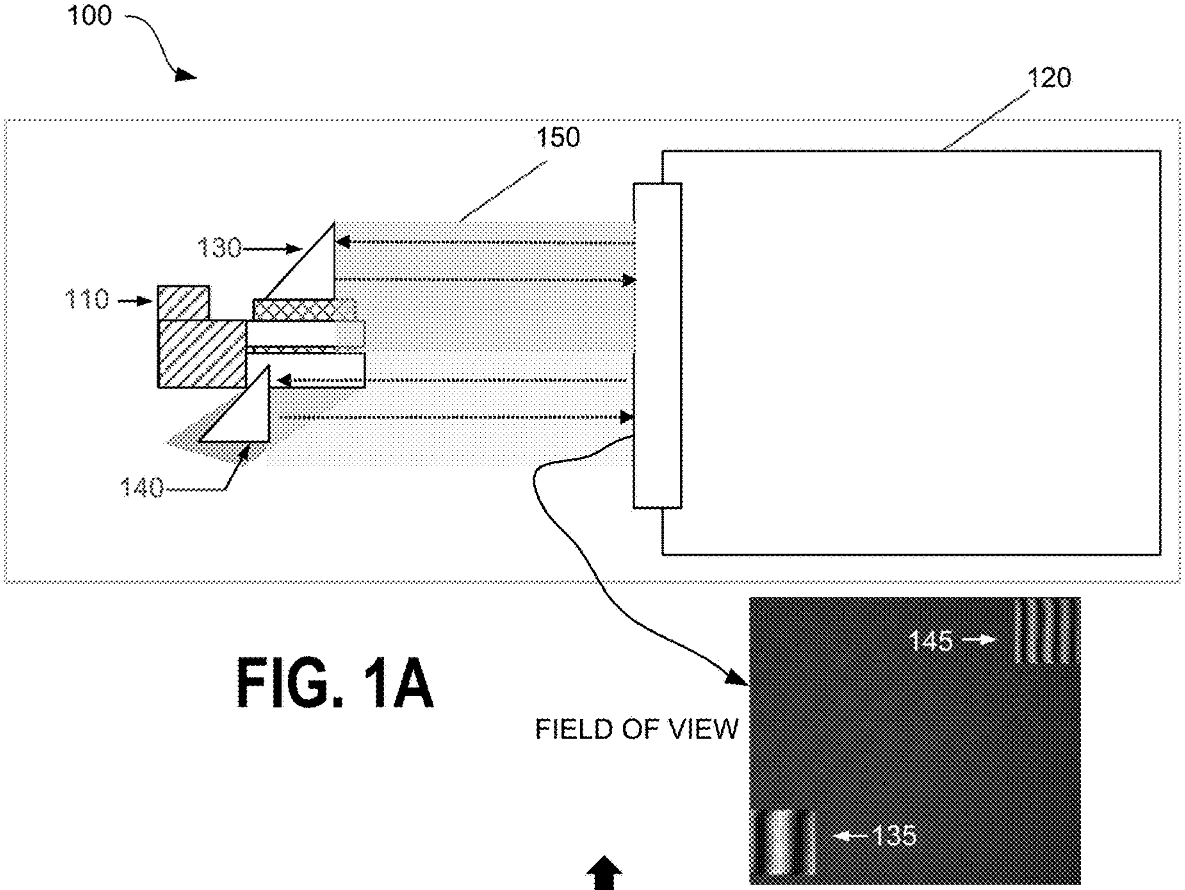
FIG. 1A is a schematic of a precision motion control system including a piezo linear actuator, according to one or more example embodiments.

An interferometer operates on the principle of optical interference, a phenomenon where two or more light waves superimpose to form a combined wave. This principle allows the interferometer to measure very small differences in distance or surface irregularities with high precision. The interferometer uses a coherent light source, typically a laser, which ensures that the light waves have a consistent phase relationship. A beam splitter is used to divide the incoming light into two beams. One beam is directed towards a reference surface, usually a mirror with a known flatness, and the other towards the surface to be measured.

Both beams are retro-reflected towards the beam splitter. The beam from the reference surface acts as a constant or control, while the beam from the measurement surface may vary depending on the surface's characteristics. The two reflected beams are recombined at the beam splitter. When they overlap, they interfere with each other. If the optical path lengths of the two beams are exactly or nearly the same, they may constructively or destructively interfere, creating a pattern of bright and dark fringes or an interference pattern. The pattern of these fringes provides information about the measured surface. For a relative tilt between the reference and measurement surface, the fringes would be straight and evenly spaced. Deviations in the tilt or quality of the objective surface cause distortions in the fringe pattern. By sampling the local intensity of the interference pattern for a series of discrete phase steps, the interferometer can detect surface irregularities and measure surface height deviations with extremely high precision, often to fractions of a wavelength of light. However, commercial interferometers typically excel at measuring static surface topographies and lack the capability to measure the relative positional or rotational characteristics of a surface in dynamic motion.

Accordingly, embodiments of the present disclosure provide a precision motion control system including an interferometer configured to emit a laser beam, a non-moving object (also referred to as reference prism) coupled to a linear actuator, and a moving object (also referred to as objective prism) coupled to the linear actuator. The non-moving object is configured to reflect one portion of the laser beam and the moving object is configured to reflect another portion of the laser beam into the interferometer. A camera coupled to the interferometer is configured to receive the reflected light from the reference prism (also referred to as a non-moving object) and the objective prism (also referred to as a moving object), which interferes with the reference beam of the interferometer to form interference patterns at the camera sensor. A processor coupled to the camera receives an image including linear interference fringes corresponding to the first portion of the laser beam, and determines a characteristic (e.g., tilt, twist, or walkoff) of the linear actuator movement based on changes in the phase, period, and angle of the linear interference fringes. The processor is further configured to receive a second image including linear interference fringes corresponding to a second portion of the laser beam, and determine a characteristic (e.g., tilt, twist, or walkoff) of the linear actuator movement based on changes in the phase, period, and angle of the linear interference fringes from the second portion. The processor then compares the phase, period, and angle of the linear interference fringes in the first portion to the phase, period, and angle of the linear interference fringes in the second portion to determine an off-axis motion of the moving object in reference to the non-moving object, in at least one direction. For example, if the twist in the non-moving object is 2 degrees and the twist in the moving object is 10 degrees, then the processor may determine that the actual twist in the moving object is 8 degrees (10-2 degrees). Similarly, if the tilt in the non-moving object is 4 degrees and the tilt in the moving object is 10 degrees, then the processor may determine that the actual tilt in the moving object is 6 degrees.

Embodiments of the present disclosure provide a method for detecting off-axis motion in a linear actuator. The method includes reflecting, by a non-moving object (e.g., reference prism) coupled to a linear actuator, a first portion of a laser beam emitted from an interferometer. The method further includes receiving, by a processor, a first image including a plurality of first linear interference fringes corresponding to the first portion of the laser beam. The method further includes determining a first characteristic (e.g., tilt, twist, or walkoff) of the linear actuator movement based on changes in the phase, period, and angle of the plurality of first linear interference fringes. The method further includes reflecting, by an object (e.g., objective prisms) coupled to the moving body of the linear actuator creating a moving object body, a second portion of the laser beam. The method further includes receiving, by the processor, a second image including a plurality of second linear interference fringes corresponding to the second portion of the laser beam and determining a second characteristic (e.g., tilt, twist, or walkoff) of the linear actuator movement based on changes in the phase, period, and angle of the plurality of second linear interference fringes. The method further includes determining an off-axis motion of the moving object in reference to the non-moving object, in at least one direction, based at least in part on the first characteristic and the second characteristic.

Embodiments of the present disclosure provide a non-transitory computer-readable medium storing instructions, which when executed by a processing device, cause the processing device to perform operations such as receiving a first image including a plurality of first linear interference fringes corresponding to a first portion of a laser beam and determining a first characteristic of the linear actuator movement based on changes in the phase, period, and angle of the plurality of first linear interference fringes. The operations further include receiving a second image including a plurality of second linear interference fringes corresponding to a second portion of the laser beam and determining a second characteristic of the linear actuator movement based on changes in the phase, period, and angle of the plurality of second linear interference fringes. The operations further include determining, based at least in part on the first characteristic and the second characteristic, an off-axis motion of a moving object in reference to the non-moving object, in at least one direction.

Measuring and controlling tilt, twist, or walkoff in a linear actuator within a precision motion control system offers several significant advantages, especially considering the high precision and accuracy required in the lithographic processes. For example, precise control of walk-out, tilt or twist ensures that the lithography system can accurately focus the image onto the substrate. Even slight angular and positional misalignments can lead to distortions, compromising the fidelity of the pattern being transferred. Additionally, because multiple layers of patterns are overlaid on top of each other, minimized walk-out, tilt or twist control ensures that these layers align correctly, which is crucial for the functionality of the IC. Misalignment can also lead to blurred or double images, causing defects in the lithographically printed patterns. By reducing defects and improving overlay accuracy, control of off-axis motion components of linear actuators can significantly increase the yield of functional devices from each panel or wafer. Minimization of off-axis motion components can also contribute to faster processing times, as less time is needed for adjustments and corrections. The ability to measure off-axis motion components may also allow the lithography system to adapt to substrates of varying thicknesses and surface topologies, ensuring consistent quality across different materials. Accordingly, the ability to precisely measure and control off-axis motion components of linear actuators within digital lithography systems is essential for ensuring high-quality, high-resolution pattern transfer, which is an important aspect of semiconductor manufacturing. For advanced semiconductor devices, feature sizes and placement accuracies are often defined at the micron and nanometer scales. Off-axis motion of an actuator can distort these features, affecting the resolution and quality of the devices. Controlling twist is therefore essential for achieving high-resolution imaging. By using or designing linear actuators that minimize tilt, twist, and walkoff, the effect on the substrate can be minimized. More importantly, using the methods and systems disclosed here one can "characterize" each linear device's precise motion and account for positioning errors in the lithography system.

FIG. 1A is schematic of a precision motion control system 100, according to one or more example embodiments. The system 100 may include a linear actuator 110 and an interferometer 120 (e.g., Fizeau interferometer) that may emit a laser beam 150. The linear actuator 110 may include a piezo linear actuator, electromagnetic linear actuator, stepper motor, servo motor, or a linear motor. A piezo linear actuator is a device that uses piezoelectric materials to produce precise linear motion. The actuator operates based on the piezoelectric effect, where certain materials change shape (expand or contract) when an electric voltage is applied. This effect is reversible, allowing for precise control over the movement. Since they operate based on an electric field and do not require magnetic fields, piezo actuators are suitable for use in sensitive optical environments, including vacuum conditions.

System 100 may further include a "non-movable" object 130 (e.g., a reference prism) that may be coupled to the non-moving portion of the linear actuator 110. The non-movable object 130 may retro-reflect a portion of the laser beam 150 into the interferometer 120 to generate one or more images 135 with an interference fringe pattern. The interference pattern may include one or more linear interference fringes with a particular phase, period, and angle. System 100 may further include a "movable" object 140 (e.g., an objective prism) referencing the moving portion of the linear actuator 110. The movable object 140 may retro-reflect a portion of the laser beam 150 into the interferometer 120 to generate one or more images 145 with an interference fringe pattern. The interference pattern may include one or more linear interference fringes with a particular phase, period, and angle. The dark box in FIG. 1A illustrates the field of view of the interferometer 120, which includes images 135, 145 having vertical interference fringe patterns formed as a result of the light reflected back from non-movable object 130 and movable object 140, respectively.

Figure 1B:
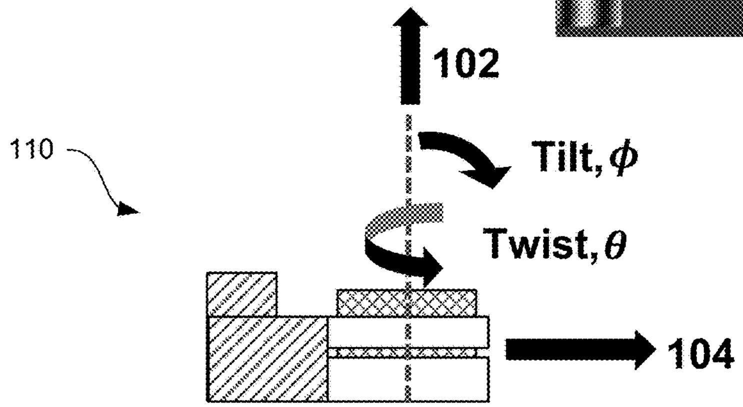
FIG. 1B is a schematic illustrating types of off-axis motion in a piezo linear actuator in a precision motion control system, according to one or more example embodiments.

FIG. 1B is a schematic illustrating types of off-axis motion in a piezo linear actuator 110 in a precision motion control system 100, according to one or more example embodiments. The regular axis of motion 102 indicates the direction in which the linear actuator is supposed to move. The undesirable lateral axis of motion 104 indicated the direction in which the linear actuator moves laterally, which is also referred to as "walkoff." However, there may be instances where the linear actuator 110 exhibits other off-axis motion components, which may be important to characterize. For example, the linear actuator 110 may tilt from the regular axis of motion 102, which may be referred to as angle θ. Alternatively or in addition, the linear actuator 110 may twist around the regular axis of motion 102. Although FIG. 1B illustrates tilt, twist, and walkoff in one direction, the methods and systems disclosed herein may be used to determine the tilt, twist, and walkoff in any direction (e.g., x, y, and z directions).

Figure 2A:
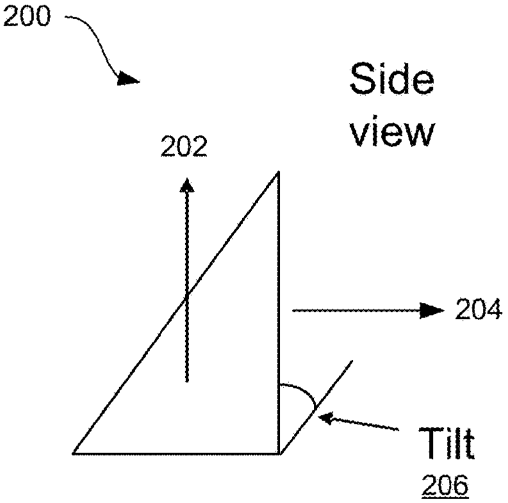
FIGS. 2A, 2C are schematics illustrating types of off-axis motion of a prism in a precision motion control system, according to one or more example embodiments.
Figure 2C:
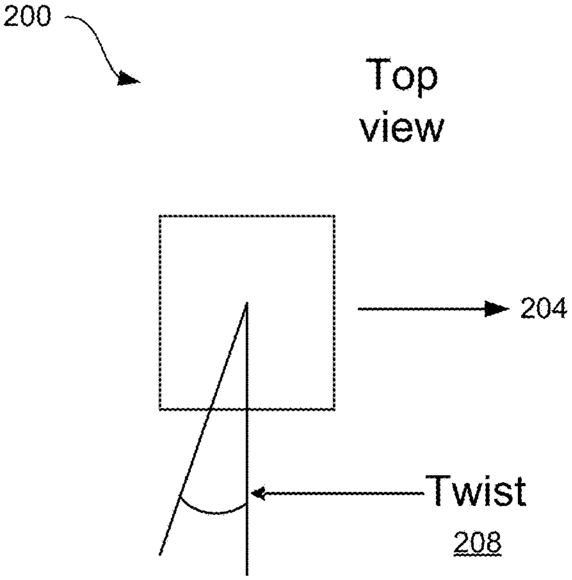

FIG. 2A shows an alternative view for illustrating a tilt 206 in movable objective prism 200. Here, the regular axis of motion 202 indicates the direction in which the movable objective prism 200 is supposed to move. The lateral axis of motion 204 indicated the direction in which the movable objective prism moves laterally. For example, the movable objective prism 200 may tilt from the regular axis of motion 202, which may be referred to as angle ϕ. Alternatively or in addition, the movable objective prism 200 may twist around the regular axis of motion 202, which is illustrated in FIG. 2C.

Figure 2B:
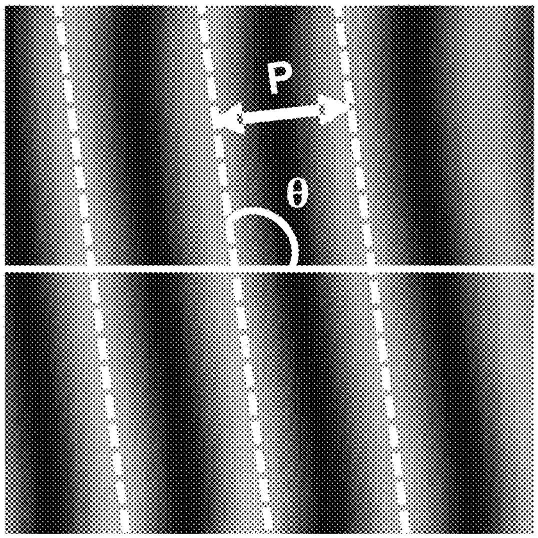
FIGS. 2B, 2D are images illustrating linear interference fringes produced as a result of the off-axis motion illustrated in FIGS. 2A, 2C, respectively.
Figure 2D:
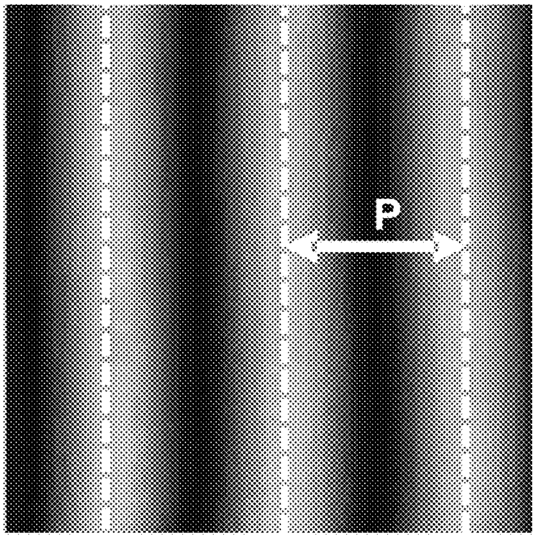

FIG. 2D illustrates an interferogram produced under normal operation where a plurality of linear interference fringes are separated by a lateral distance "P," also referred to as the period. The period refers to lateral distance between one peak and an adjacent peak when the linear interference fringes are represented in a sinusoidal wave form. FIG. 2B illustrates an interferogram resulting from detecting a tilt or twist in the movable objective prism 200. As illustrated here, the lateral distance between the linear interference fringes decreases and the angle between the linear interference fringes and the Y-axis (or horizontal axis) increases from 90° to θ.

Figure 3A:
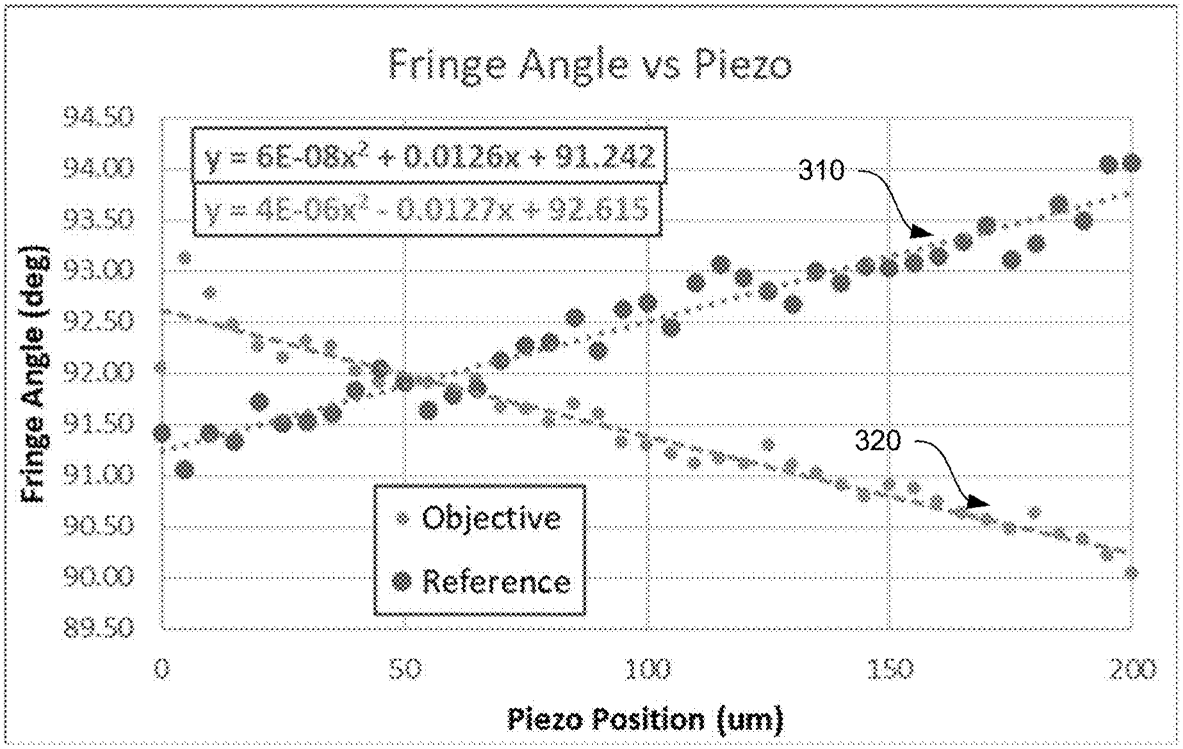
FIGS. 3A-C illustrate example steps in a method for fitting curves obtained from light reflected from a moving object (e.g., objective prism) and light reflected from a non-moving object (e.g. reference prism) of a precision motion control system, according to one or more example embodiments.
Figure 3B:
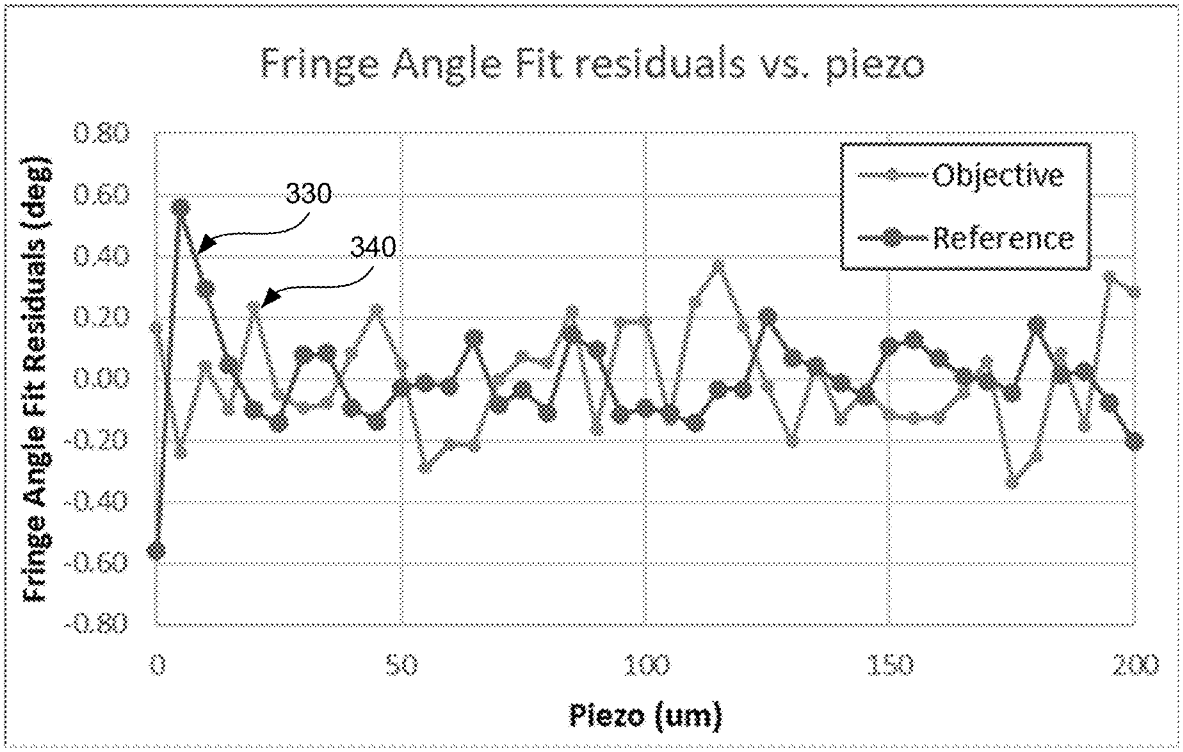
Figure 3C:
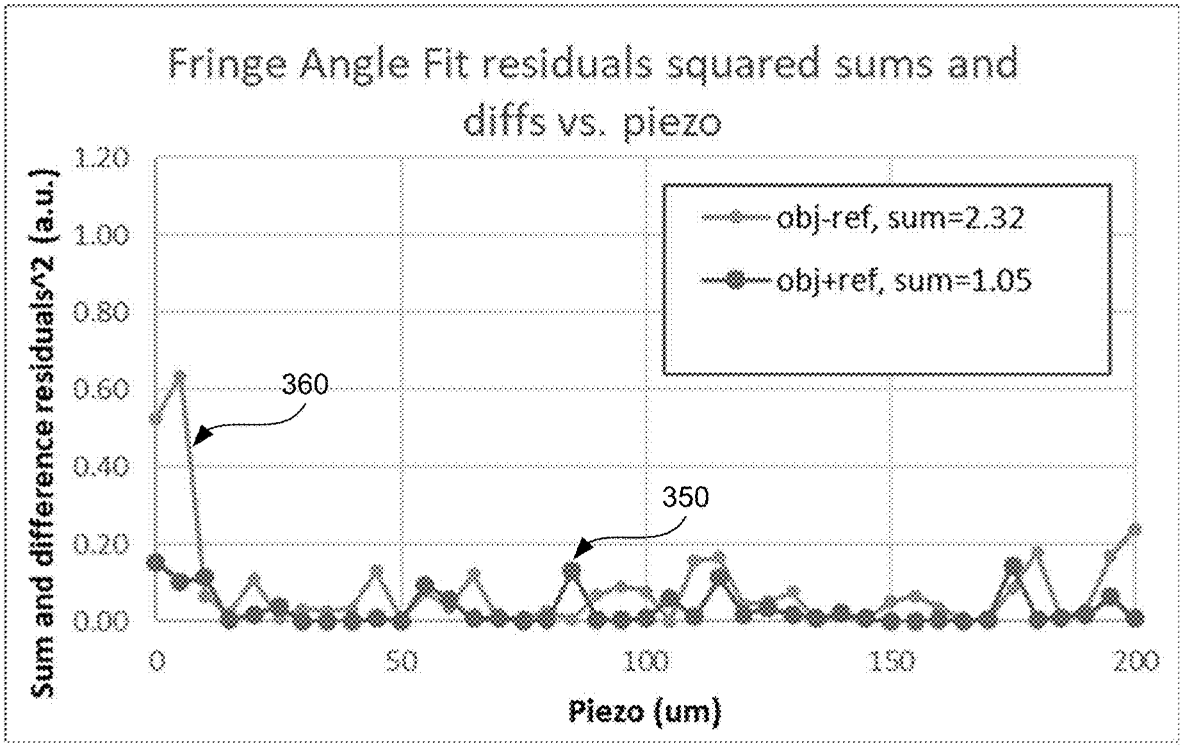

FIGS. 3A-C illustrate example steps in a method for fitting curves obtained from light reflected from the objective surface (e.g., movable prism) and light reflected from a reference surface (e.g., non-movable prism) of the precision motion control system, according to one or more example embodiments. In FIG. 3A, the position of the piezo linear actuator (μm) is plotted against the fringe angle (degrees) for the reference signal 310 (e.g., signal generated from light reflected from the non-movable prism) and the objective signal 320 (e.g., signal generated from light reflected from the movable prism). In FIG. 3B, the position of the piezo linear actuator (μm) is plotted against the fringe angle fit residuals (degrees) for the reference signal 330 (e.g., signal generated from light reflected from the non-movable prism) and the objective signal 340 (e.g., signal generated from light reflected from the movable prism). In FIG. 3C, the position of the piezo linear actuator (μm) is plotted against the squared sum and difference residual values for the reference signal 350 and the objective (or objective) signal 360.

In some embodiments, the reference signal represents the change in the measured degrees of freedom of the stationary part of the linear actuator. The objective signal represents the change in the measured degrees of freedom of the moving part of the linear actuator. Their rotational alignments of their individual representing optics may have different orientations when being measured, which can cause them to have opposite responses when the same rotation or movement is applied to them. In FIGS. 3A-C, their fitted response are plotted to compare the relative signs of their residual responses to determine whether to add or subtract their measured signal responses. Each interferogram for both reference and objective is calculated independently for each step of the linear actuator's range of travel.

In one example, fitting the objective signal to the reference signal to a 2D sinusoid may involve using the formula:

$$I(x, y) = A * \sin\left(\frac{2\pi(x\cos(\theta) + y\sin(\theta))}{\lambda} + \phi\right) + C$$

Where A is the amplitude or center of wave to peak, $\phi$ is the phase or change in phase as the peak moves left or right perpendicular to the clock axis, $\lambda$ is the wavelength of the laser beam, $\theta$ is the clock angle, C is the offset or the data's amplitude bias, and x and y are the x and y coordinates, respectively, and I(x,y) is the intensity of the pixel at location (x, y).

In some embodiments, the method may further include determining a characteristic (phase, period, or angle) of the linear interference fringes in the first image 135. The method may involve approximating (fitting) the linear interference fringes with a 2D sinusoidal waveform to determine an average period of a plurality of interference fringes. The method may further involve determining a clock angle of the interference fringes with respect to a horizontal axis and determining a tilt in the non-moving object 130 based on the fringe period and the clock angle. In some embodiments, the tilt can be determined using a formula:

$$\text{Tilt} = \text{Sin}^{-1}\left(\frac{\text{Pixel}_{size} * \text{Sin}\left(\theta - \frac{\pi}{2}\right) * \lambda}{2 * P}\right)$$

wherein $\text{Pixel}_{size}$ is the camera sensor's pixel size in the first image 135, $\theta$ is the fringe clock angle, $\lambda$ is a wavelength of the laser beam, and P is the period. The value of P changes between reference/objective since the period of the representative sinusoid may be different for the objective/reference images.

In some embodiments, the method may further include determining a characteristic (phase, period, or angle) of the linear interference fringes in the second image 145. The method may involve approximating the linear interference fringes with a 2D sinusoidal waveform to determine an average period of the interference fringes. The method may further involve determining a clock angle of the interference fringes with respect to a horizontal axis and determining a tilt in the moving object 140 based on the fringe period and the clock angle. In some embodiments, the tilt can be determined using a formula:

$$\text{Tilt} = \text{Sin}^{-1}\left(\frac{\text{Pixel}_{size} * \text{Sin}\left(\theta - \frac{\pi}{2}\right) * \lambda}{2 * P}\right)$$

wherein $\text{Pixel}_{size}$ is the camera sensor's pixel size in the second image 145, 0 is the clock angle, $\lambda$ is a wavelength of the laser beam, and P is the period. The tilt from the first image 135 and the tilt from the second image 145 are then compared to determine the actual tilt in the movable object 140 with respect to the non-movable object 130. For example, if the tilt in the non-moving object is 0 degrees and the tilt in the moving object is 10 degrees, then the processor may determine that the actual tilt in the moving object is 10 degrees (10-0 degrees).

In some embodiments, the method may further include determining a characteristic (phase, period, or angle) of the linear interference fringes in the first image 135. The method may involve approximating (fitting) the linear interference fringes with a 2D sinusoidal waveform to determine an average period of the interference fringes. The method may further involve determining a clock angle of the interference fringes with respect to a horizontal axis and determining a twist in the non-moving object 130 based on the fringe period and the clock angle. In some embodiments, the twist is determined using a formula:

$$\text{Twist} = \text{Sin}^{-1}\left(\frac{\text{Pixel}_{size} * \text{Cos}\left(\frac{\pi}{2} - \theta\right) * \lambda}{2 * P}\right)$$

wherein $\text{Pixel}_{size}$ is the camera sensor's pixel size in the first image 135, $\theta$ is the clock angle, $\lambda$ is a wavelength of the laser beam, and P is the period.

In some embodiments, the method may further include determining a characteristic (phase, period, or angle) of the linear interference fringes in the second image 145. The method may involve approximating (fitting) the linear interference fringes with a 2D sinusoidal waveform to determine an average period of the interference fringes. The method may further involve determining a clock angle of the interference fringes with respect to a horizontal axis and determining a twist in the moving object 140 based on the fringe period and the clock angle. In some embodiments, the twist is determined using a formula:

$$\text{Twist} = \text{Sin}^{-1}\left(\frac{\text{Pixel}_{size} * \text{Cos}\left(\frac{\pi}{2} - \theta\right) * \lambda}{2 * P}\right)$$

wherein $\text{Pixel}_{size}$ is the camera sensor's pixel size in the second image 145, $\theta$ is the clock angle, $\lambda$ is a wavelength of the laser beam, and P is the period. The twist from the first image 135 and the twist from the second image 145 are then compared to determine the actual twist in the movable object 140 with respect to the non-movable object 130. For example, if the twist in the non-moving object is 2 degrees and the twist in the moving object is 10 degrees, then the processor may determine that the actual twist in the moving object is 8 degrees (10-2 degrees).

Although the above examples are described with respect to vertical linear interference fringes, the same methods may be applied to horizontal interference fringes or angular interference fringes to determine the off-axis motion (e.g., tilt or twist) in the linear actuator.

Figure 4:
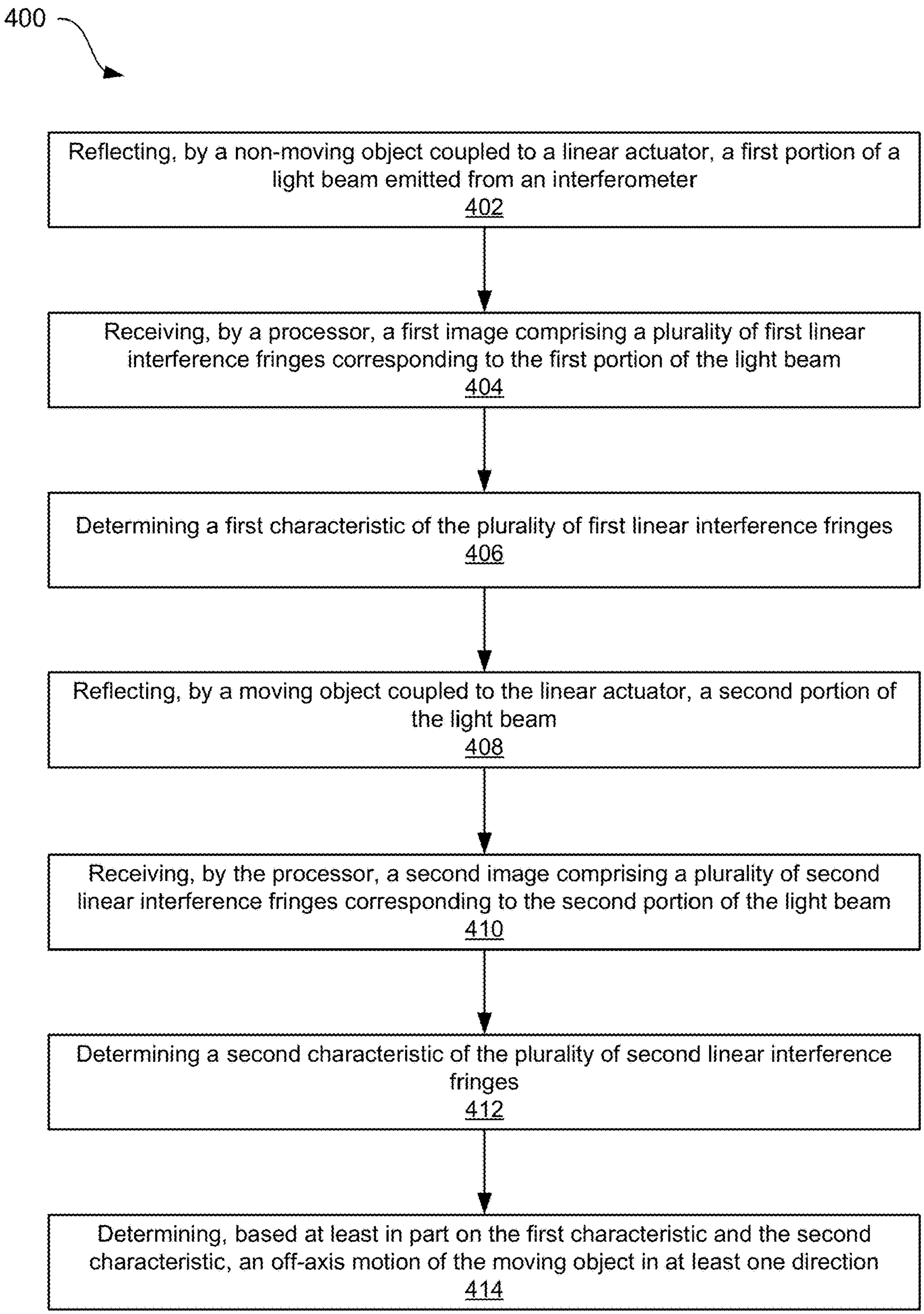
FIG. 4 illustrates example steps in a method for detecting off-axis motion in a linear actuator in a precision motion control system, according to one or more example embodiments.

FIG. 4 illustrates example steps in a method 400 for detecting off-axis motion in a linear actuator, according to one or more example embodiments. Method 400 may be performed by one or more processing devices that may be coupled to the light source in the digital lithography system and include hardware (e.g., circuitry, dedicated logic), software (such as is run on a specialized computer system or a dedicated machine), or a combination of both. Method 400 and each of its individual functions, routines, subroutines, or operations may be performed by one or more processors of the processing device executing the method.

At operation 402, the method may include reflecting, by a non-moving object coupled to a linear actuator, a first portion of a laser beam emitted from an interferometer. At operation 404, the method further includes receiving, by a processor, a first image including a plurality of first linear interference fringes corresponding to the first portion of the laser beam. At operation 406, the method further includes determining a first characteristic (phase, period, and angle) of the plurality of first linear interference fringes. At operation 408, the method further includes reflecting, by a moving object coupled to the linear actuator, a second portion of the laser beam. At operation 410, the method further includes receiving, by the processor, a second image including a plurality of second linear interference fringes corresponding to the second portion of the laser beam. At operation 412, the method further includes determining a second characteristic (phase, period, and angle) of the plurality of second linear interference fringes. At operation 414, the method further includes determining, based at least in part on the first characteristic and the second characteristic, an off-axis motion of the moving object in at least one direction.

Figure 5A:
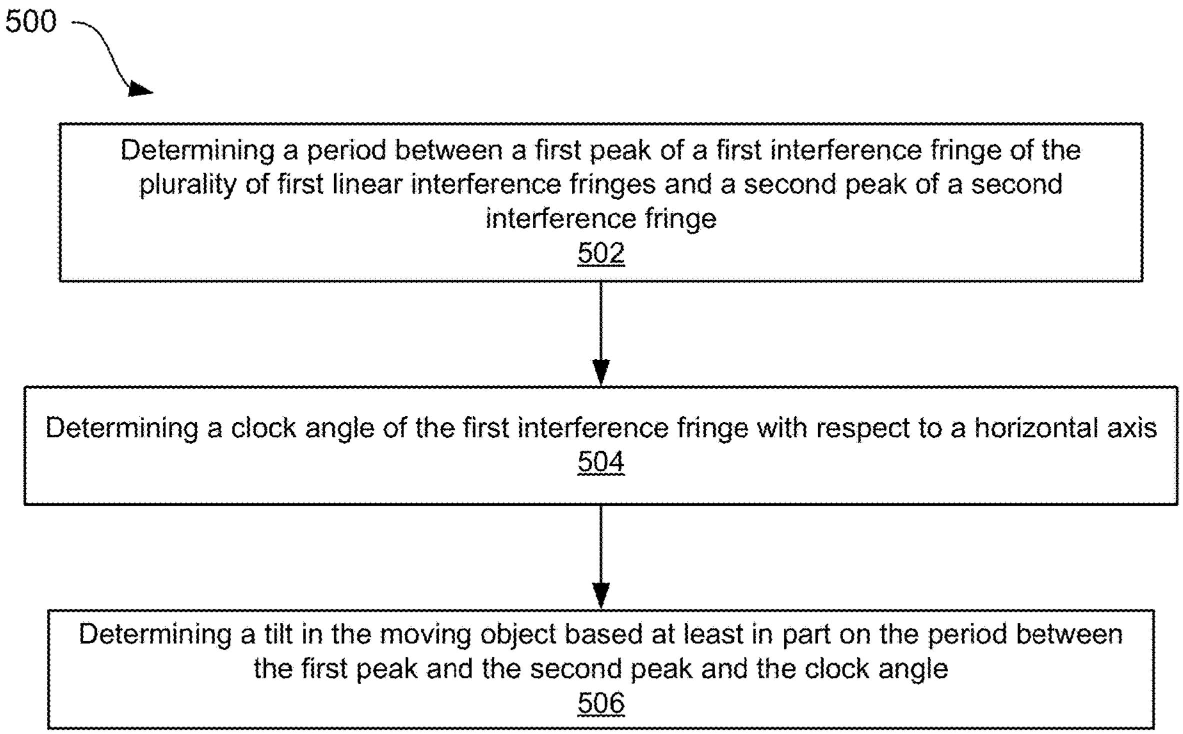
FIGS. 5A-B illustrate example steps in a method for detecting off-axis motion (e.g., tilt, twist, or walk-off) in a linear actuator in a precision motion characterization system, according to one or more example embodiments.

FIG. 5A illustrates example steps in a method 500 for detecting off-axis motion (e.g., tilt) in a linear actuator, according to one or more example embodiments. Method 500 may be performed by one or more processing devices that may be coupled to the light source in the digital lithography system and include hardware (e.g., circuitry, dedicated logic), software (such as is run on a specialized computer system or a dedicated machine), or a combination of both. Method 500 and each of its individual functions, routines, subroutines, or operations may be performed by one or more processors of the processing device executing the method.

The method 500 may further include determining a characteristic (e.g., tilt) of the linear interference fringes in the first image 135. The method may involve approximating (fitting) the linear interference fringes with a 2D sinusoidal waveform to determine a period between adjacent fringes. The method may further involve determining a clock angle of the interference fringes with respect to a horizontal axis and determining a tilt in the non-moving object 130 based on the fringe period and the clock angle. In some embodiments, the tilt can be determined using a formula:

$$\text{Tilt} = \text{Sin}^{-1}\left(\frac{\text{Pixel}_{size} * \text{Sin}\left(\theta - \frac{\pi}{2}\right) * \lambda}{2 * P}\right)$$

wherein $\text{Pixel}_{size}$ is the camera sensor's pixel size in the first image 135, θ is the clock angle, λ is a wavelength of the laser beam, and P is the period.

The method 500 may further include determining a characteristic (e.g., tilt) of the linear interference fringes in the second image 145. At operation 502, the method may involve approximating (fitting) the linear interference fringes with a 2D sinusoidal waveform to determine a period between adjacent fringes. At operation 504, the method may further involve determining a clock angle of the interference fringes with respect to a horizontal axis. At operation 506, the method may involve determining a tilt in the moving object 140 based on the fringe period and the clock angle. In some embodiments, the tilt can be determined using a formula:

$$\text{Tilt} = \text{Sin}^{-1}\left(\frac{\text{Pixel}_{size} * \text{Sin}\left(\theta - \frac{\pi}{2}\right) * \lambda}{2 * P}\right)$$

wherein $\text{Pixel}_{size}$ is the camera sensor's pixel size in the second image 145, θ is the clock angle, λ is a wavelength of the laser beam, and P is the period. The tilt from the first image 135 and the tilt from the second image 145 are then compared to determine the actual tilt in the movable object 140 with respect to the non-movable object 130. For example, if the tilt in the non-moving object is 0 degrees and the tilt in the moving object is 10 degrees, then the processor may determine that the actual tilt in the moving object is 10 degrees (10-0 degrees).

Figure 5B:
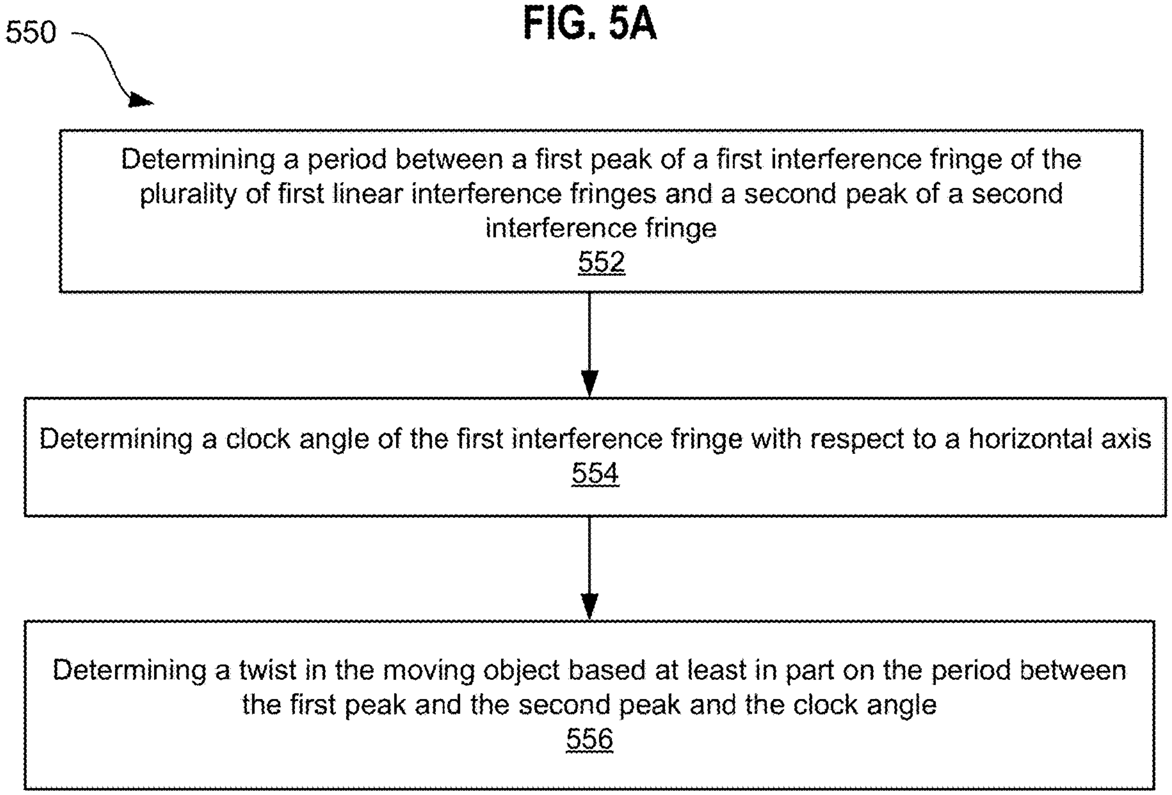

FIG. 5B illustrates example steps in a method 550 for detecting off-axis motion (e.g., twist) in a linear actuator, according to one or more example embodiments. Method 550 may be performed by one or more processing devices that may be coupled to the light source in the digital lithography system and include hardware (e.g., circuitry, dedicated logic), software (such as is run on a specialized computer system or a dedicated machine), or a combination of both. Method 550 and each of its individual functions, routines, subroutines, or operations may be performed by one or more processors of the processing device executing the method.

Method 550 may include determining a characteristic (e.g., twist) of the linear interference fringes in the first image 135. The method may involve approximating (fitting) the linear interference fringes with a 2D sinusoidal waveform to determine a period between adjacent fringes. The method may further involve determining a clock angle of the interference fringes with respect to a horizontal axis and determining a twist in the non-moving object 130 based on the fringe period and the clock angle. In some embodiments, the twist is determined using a formula:

$$\text{Twist} = \text{Sin}^{-1}\left(\frac{\text{Pixel}_{size} * \text{Cos}\left(\frac{\pi}{2} - \theta\right) * \lambda}{2 * P}\right)$$

wherein $\text{Pixel}_{size}$ is the camera sensor's pixel size in the first image 135, θ is the clock angle, λ is a wavelength of the laser beam, and P is the period.

The method 550 may further include determining a characteristic (e.g., twist) of the linear interference fringes in the second image 145. At operation 552, the method may involve approximating (fitting) the linear interference fringes with a 2D sinusoidal waveform and determining a period between a first peak and an adjacent peak. At operation 554, the method may further involve determining a clock angle of the interference fringes with respect to a horizontal axis. At operation 556, the method may involve determining a twist in the moving object 140 based on the fringe period and the clock angle. In some embodiments, the twist is determined using a formula:

$$\text{Twist} = \text{Sin}^{-1}\left(\frac{\text{Pixel}_{size} * \text{Cos}\left(\frac{\pi}{2} - \theta\right) * \lambda}{2 * P}\right)$$

wherein $\text{Pixel}_{size}$ is the camera sensor's pixel size in the second image 145, θ is the clock angle, λ is a wavelength of the laser beam, and P is the period. The twist from the first image 135 and the twist from the second image 145 are then compared to determine the actual twist in the movable object 140 with respect to the non-movable object 130. For example, if the twist in the non-moving object is 2 degrees and the twist in the moving object is 10 degrees, then the processor may determine that the actual twist in the moving object is 8 degrees (10-2 degrees).

Figure 6:
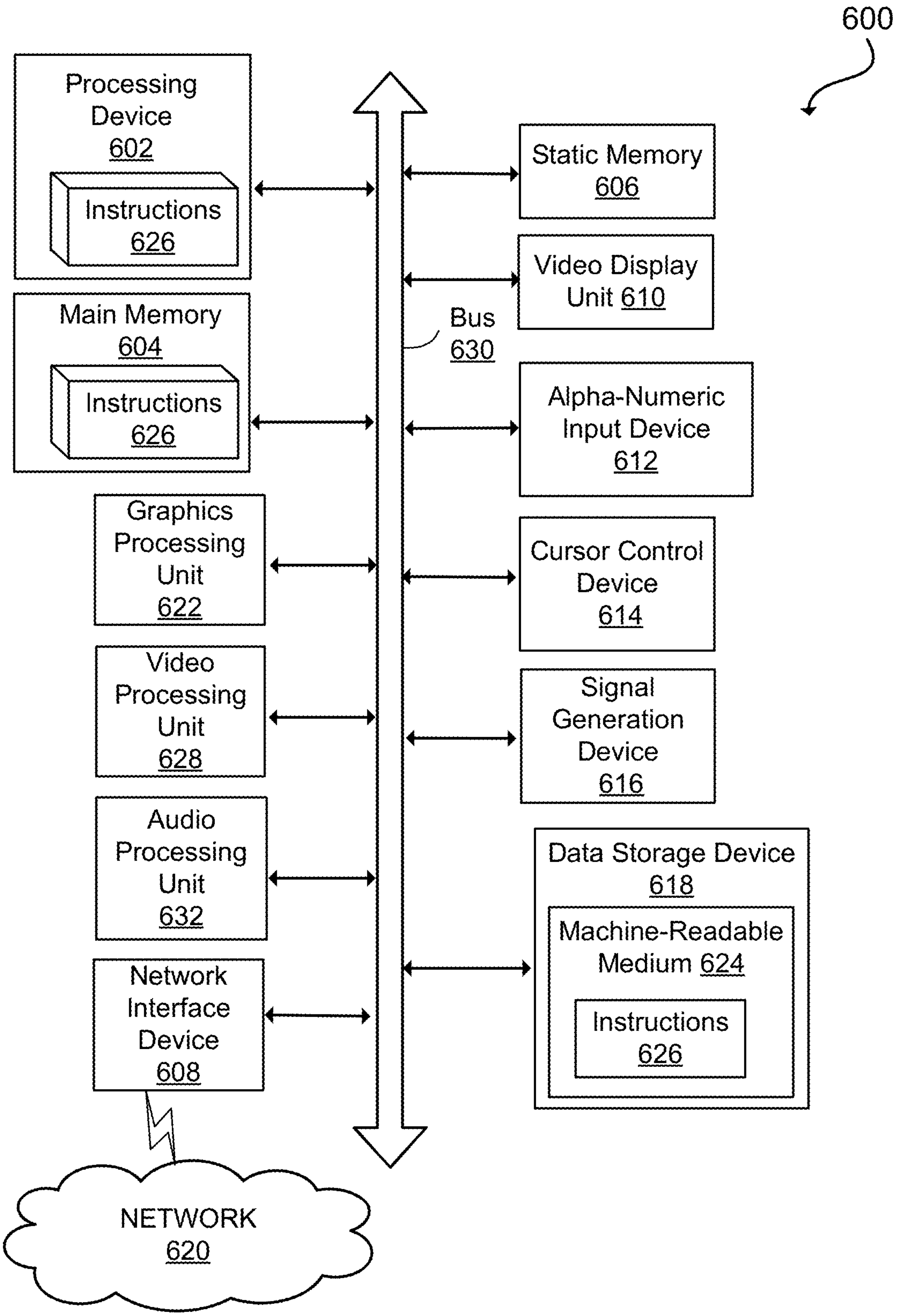
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein, including determining off-axis motion in a linear actuator, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like, which may be coupled to a light source (e.g., laser) of a digital lithography system. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one embodiment, the non-transitory computer readable medium may include instructions 626 which when executed by a processing device (e.g., processing device 602), cause the processing device to determine off-axis motion of a linear actuator as described in FIGS. 3A-5B. In some embodiments, instructions 626 may include machine learning algorithms that may be trained to predict the outcomes of these simulations more efficiently. The training data for these algorithms may be derived from the results of physics-based simulations. By learning from these data, the machine learning models can predict the results of new simulations much faster than running a simulation.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:

an interferometer configured to emit a laser beam;

a first object coupled to a non-moving portion of a linear actuator, the first object configured to reflect a first portion of the laser beam;

a second object coupled to a moving portion of the linear actuator, the second object configured to reflect a second portion of the laser beam; and a processor to perform operations comprising:

receiving a first image comprising a plurality of first linear interference fringes corresponding to the first portion of the laser beam;

determining a first characteristic of the plurality of first linear interference fringes;

receiving a second image comprising a plurality of second linear interference fringes corresponding to the second portion of the laser beam;

determining a second characteristic of the plurality of second linear interference fringes; and determining, based at least in part on the first characteristic and the second characteristic, an off-axis motion of the second object in at least one direction.

2. The system of claim 1, wherein the linear actuator comprises at least one of a piezo linear actuator, electromagnetic linear actuator, stepper motor, servo motor, or a linear motor.

3. The system of claim 1, wherein determining a first characteristic of the plurality of first linear interference fringes further comprises:

determining a phase of the plurality of first linear interference fringes;

determining an average period of a plurality of first interference fringes;

determining a clock angle of the first interference fringe with respect to a horizontal axis; and determining a tilt in the second object based at least in part on the average period and the clock angle.

4. The system of claim 3, wherein the tilt is determined using a formula:

$$\text{Tilt} = \text{Sin}^{-1}\left(\frac{\text{Pixel}_{size} * \text{Sin}\left(\theta - \frac{\pi}{2}\right) * \lambda}{2 * P}\right)$$

wherein $\text{Pixel}_{size}$ is a size of a pixel in the first image, θ is the clock angle, λ is a wavelength of the laser beam, and P is the period.

5. The system of claim 1, wherein determining a first characteristic of the plurality of first linear interference fringes further comprises:

determining an average period of a plurality of first interference fringes;

determining a clock angle of the first interference fringe with respect to a horizontal axis; and determining a twist in the second object based at least in part on the average period and the clock angle.

6. The system of claim 5, wherein the twist is determined using a formula:

$$\text{Twist} = \text{Sin}^{-1}\left(\frac{\text{Pixel}_{size} * \text{Cos}\left(\frac{\pi}{2} - \theta\right) * \lambda}{2 * P}\right)$$

wherein $\text{Pixel}_{size}$ is a size of a pixel in the first image, θ is the clock angle, λ is a wavelength of the laser beam, and P is the period.

7. The system of claim 1, wherein the plurality of first linear interference fringes and second linear interference fringes comprise at least one of vertical interference fringes, horizontal interference fringes, or angular interference fringes.

8. The system of claim 1, wherein determining the off-axis motion of the second object further comprises at least one of fitting a reference signal corresponding to the first characteristic with an objective signal corresponding to the second characteristic or applying Fourier transform to the reference signal and the objective signal.

9. A method comprising:

reflecting, by a first object coupled to a non-moving body of a linear actuator, a first portion of a laser beam emitted from an interferometer;

receiving, by a processor, a first image comprising a plurality of first linear interference fringes corresponding to the first portion of the laser beam;

determining a first characteristic of the plurality of first linear interference fringes;

reflecting, by a second object coupled to a moving body of the linear actuator, a second portion of the laser beam;

receiving, by the processor, a second image comprising a plurality of second linear interference fringes corresponding to the second portion of the laser beam;

determining a second characteristic of the plurality of second linear interference fringes; and determining, based at least in part on the first characteristic and the second characteristic, an off-axis motion of the second object in at least one direction.

10. The method of claim 9, wherein determining a first characteristic of the plurality of first linear interference fringes further comprises:

determining a phase of the interference fringes;

determining an average period of a plurality of first interference fringes;

determining a clock angle of the first interference fringe with respect to a horizontal axis; and determining a tilt in the second object based at least in part on the average period and the clock angle.

11. The method of claim 10, wherein the tilt is determined using a formula:

$$\text{Tilt} = \text{Sin}^{-1}\left(\frac{\text{Pixel}_{size} * \text{Sin}\left(\theta - \frac{\pi}{2}\right) * \lambda}{2 * P}\right)$$

wherein $\text{Pixel}_{size}$ is a size of a pixel in the first image, θ is the clock angle, λ is a wavelength of the laser beam, and P is the period.

12. The method of claim 9, wherein determining a first characteristic of the plurality of first linear interference fringes further comprises:

determining a phase of the plurality of first linear interference fringes;

determining an average fringe period;

determining a clock angle of the first interference fringe with respect to a horizontal axis; and determining a twist in the second object based at least in part on the average fringe period and the clock angle.

13. The method of claim 12, wherein the twist is determined using a formula:

$$\text{Twist} = \text{Sin}^{-1}\left(\frac{\text{Pixel}_{size} * \text{Cos}\left(\frac{\pi}{2} - \theta\right) * \lambda}{2 * P}\right)$$

wherein $\text{Pixel}_{size}$ is a size of a pixel in the first image, θ is the clock angle, λ is a wavelength of the laser beam, and P is the period.

14. The method of claim 9, wherein the plurality of first linear interference fringes and second linear interference fringes comprise at least one of vertical interference fringes, horizontal interference fringes, or angular interference fringes.

15. The method of claim 9, wherein determining the off-axis motion of the second object further comprises at least one of fitting a reference signal corresponding to the first characteristic with an objective signal corresponding to the second characteristic or applying Fourier transform to the reference signal and the objective signal.

16. A non-transitory computer-readable medium storing instructions, which when executed by a processing device, cause the processing device to perform operations comprising:

receiving a first image comprising a plurality of first linear interference fringes corresponding to a first portion of a laser beam;

determining a first characteristic of the plurality of first linear interference fringes;

receiving a second image comprising a plurality of second linear interference fringes corresponding to a second portion of the laser beam;

determining a second characteristic of the plurality of second linear interference fringes; and determining, based at least in part on the first characteristic and the second characteristic, an off-axis motion of an object in at least one direction.

17. The non-transitory computer-readable medium of claim 16, wherein determining a first characteristic of the plurality of first linear interference fringes further comprises:

determining a phase of the plurality of the first linear interference fringes;

determining an average fringe period;

determining a clock angle of the first interference fringe with respect to a horizontal axis; and determining a tilt in the object based at least in part on the average fringe period and clock angle.

18. The non-transitory computer-readable medium of claim 16, wherein determining a first characteristic of the plurality of first linear interference fringes further comprises:

determining a phase of the plurality of first linear interference fringes;

determining an average fringe period;

determining a clock angle of the first interference fringe with respect to a horizontal axis; and determining a twist in the object based at least in part on the average fringe period and clock angle.

19. The non-transitory computer-readable medium of claim 16, wherein the plurality of first linear interference fringes and second linear interference fringes comprise at least one of vertical interference fringes, horizontal interference fringes, or angular interference fringes.

20. The non-transitory computer-readable medium of claim 16, wherein determining the off-axis motion of the object further comprises at least one of fitting a reference signal corresponding to the first characteristic with an objective signal corresponding to the second characteristic or applying Fourier transform to the reference signal and the objective signal.

* * * * *